(12) United States Patent
Blackwell et al.

(10) Patent No.: US 9,354,414 B2
(45) Date of Patent: May 31, 2016

(54) DROP CABLE ASSEMBLY

(75) Inventors: Benjamin Roberts Blackwell, Hickory, NC (US); Stephen Robert Horan, Jr., Hickory, NC (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 277 days.

(21) Appl. No.: 13/589,282

(22) Filed: Aug. 20, 2012

(65) Prior Publication Data

US 2013/0051742 A1 Feb. 28, 2013

Related U.S. Application Data

(60) Provisional application No. 61/527,271, filed on Aug. 25, 2011.

(51) Int. Cl.
*G02B 6/44* (2006.01)
(52) U.S. Cl.
CPC .................................. *G02B 6/4433* (2013.01)
(58) Field of Classification Search
None
See application file for complete search history.

(56) References Cited

U.S. PATENT DOCUMENTS

| | | | |
|---|---|---|---|
| 6,542,674 B1 | 4/2003 | Gimblet | 385/113 |
| 6,836,603 B1 | 12/2004 | Bocanegra et al. | 385/113 |
| 7,313,304 B2 * | 12/2007 | Andrews et al. | 385/107 |
| 2007/0047884 A1 | 3/2007 | Storaasli et al. | 385/100 |
| 2008/0253723 A1 * | 10/2008 | Stokes et al. | 385/114 |
| 2010/0135624 A1 | 6/2010 | Overton et al. | 385/102 |
| 2010/0158453 A1 * | 6/2010 | Cody et al. | 385/100 |
| 2010/0290747 A1 | 11/2010 | Bringuier et al. | 385/107 |
| 2014/0241677 A1 * | 8/2014 | Sutehall | G02B 6/4433 385/104 |

OTHER PUBLICATIONS

Corning SST-Drop Single-Tube, Gel-Filled Cable, Corning Catalog2, 2011, pp. 1-3.
Corning RPX Gel-Free Ribbon Cable, EVO-649-EN, pp. 1-4.
Superior Essex, Solving the Problem of Excess Drop Cable FTTP Tight Buffered Indoor/Outdoor Drop (Series W7) Applications, 2010, TG42 Rev. 1, pp. 1-2.
Superior Essex, Toneable Drop FTTP Series 571Q, Rev 7/10, Ed 10.2, C-34.
Superior Essex, Toneable FTTP OFCR Series 57CR, Rev 10/10, Ed 10.3, C-35.

* cited by examiner

*Primary Examiner* — Tina Wong
(74) *Attorney, Agent, or Firm* — William D. Doyle

(57) ABSTRACT

A drop cable assembly has a drop cable and an outer sheath formed around the drop cable that encloses and reinforces the drop cable. The drop cable is accommodated within a cavity of the outer sheath and includes strength members.

20 Claims, 2 Drawing Sheets

DROP CABLE ASSEMBLY

RELATED APPLICATIONS

This application claims the benefit of priority under 35 U.S.C. §119 of U.S. Provisional Application Ser. No. 61/527,271 filed on Aug. 25, 2011, the content of which is relied upon and incorporated herein by reference in its entirety.

BACKGROUND

Drop cables have been used to provide optical connectivity to individual residences and other locations. When providing such services to residences, so-called "fiber-to-the-home" (FTTH) applications, fiber optical cables are often aerial cables that are subject to wind and ice loading, and other mechanical stresses. Aerial cables such as those used in FTTH applications must therefore be of relatively high strength so that they do not break under tension. One solution is to include a metallic messenger conductor in the cable, such as those used in 'figure 8'drop cables. Alternatively, a fiber optic cable can be lashed to a separate messenger cable to that some of the weight caused by stresses such as ice loading is supported by the messenger cable.

SUMMARY

According to one aspect, a fiber optical cable assembly comprises a drop cable, comprising: a drop cable jacket; and a core surrounded by the primary jacket, the core including at least one optical fiber; and an outer sheath enclosing the drop cable, the outer sheath comprising: a sheath jacket having a sheath cavity, the sheath cavity accommodating the drop cable; and at least one strength member embedded in the sheath jacket.

According to another aspect, a method of making a fiber optic cable assembly comprises: providing a drop cable, comprising: a drop cable jacket; and a core surrounded by the primary jacket, the core including at least one optical fiber; advancing the drop cable along a process direction; forming an outer sheath around the drop cable, the outer sheath comprising: a sheath jacket having a sheath cavity, the sheath cavity accommodating the drop cable; and at least one strength member embedded in the sheath jacket.

According to one embodiment, a fiber optic cable assembly includes a drop cable and an outer sheath enclosing the drop cable. The drop cable includes a drop cable jacket, a core surrounded by the drop cable jacket, the core comprising an optical fiber, and first and second strength members embedded in the drop cable jacket. The outer sheath includes a sheath jacket having a sheath cavity, the sheath cavity accommodating the drop cable therein, and first and second strength members of the outer sheath embedded in the sheath jacket. The first and second strength member of the outer sheath have greater cross-sections than either of the first and second strength members of the drop cable. The drop cable occupies at least 65% of a cross-sectional area of the sheath cavity but less than 95% of the cross-sectional area of the sheath cavity, where the drop cable can translate longitudinally within and with respect to the sheath cavity.

According to another embodiment, a method of making a fiber optic cable assembly includes providing a drop cable, advancing the drop cable along a process direction, and forming an outer sheath around the drop cable. The drop cable includes a drop cable jacket, a core surrounded by the drop cable jacket (the core including an optical fiber), and first and second strength members embedded in the drop cable jacket. The first and second strength members of the drop cable located on opposite sides of the core. The outer sheath includes a sheath jacket having a sheath cavity, the sheath cavity accommodating the drop cable therein. The outer sheath further includes first and second strength members of the outer sheath embedded in the sheath jacket, where the first and second strength members of the outer sheath are located on opposite sides of the sheath cavity. The drop cable occupies at least 65% of a cross-sectional area of the sheath cavity but less than 95% of the cross-sectional area of the sheath cavity, and the drop cable can translate longitudinally within and with respect to the sheath cavity.

According to yet another embodiment, a fiber optic cable assembly includes a flat drop cable and an outer sheath enclosing the drop cable. The drop cable includes a drop cable jacket having generally flat upper and lower surfaces, a core surrounded by the primary jacket (the core including at least one optical fiber), and a first strength member on one side of the core and a second strength member on a second side of the core. The outer sheath includes a sheath jacket having generally flat upper and lower surfaces and having a sheath cavity, the sheath cavity accommodating the drop cable. The outer sheath further includes a first and a second strength member embedded in the sheath jacket, one on each side of the sheath cavity. The first and second strength members of the outer sheath and the first and second strength members of the drop cable each consist essentially of the same material as one another, but the first and second strength members of the outer sheath have a greater load-bearing capacity than the first and second strength members of the drop cable. The drop cable can translate longitudinally within the outer sheath cavity.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

DETAILED DESCRIPTION

Figure 1:
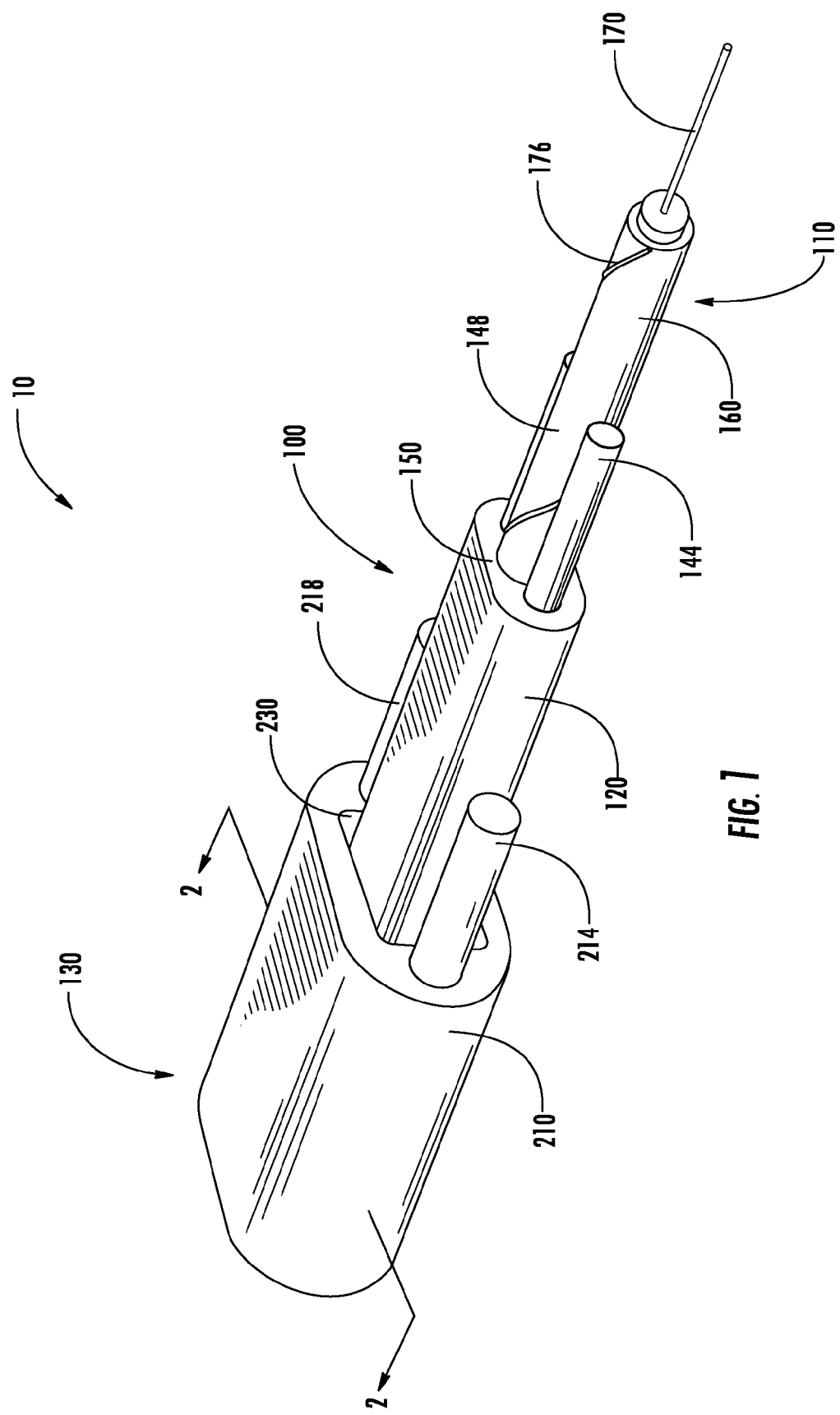
FIG. 1 is a partial cutaway view of a drop cable assembly according to a first embodiment.

Reference will now be made in detail to the present embodiments, examples of which are illustrated in the accompanying drawings. Whenever possible, the same reference numerals will be used throughout the drawings to refer to the same or like parts.

Figure 2:
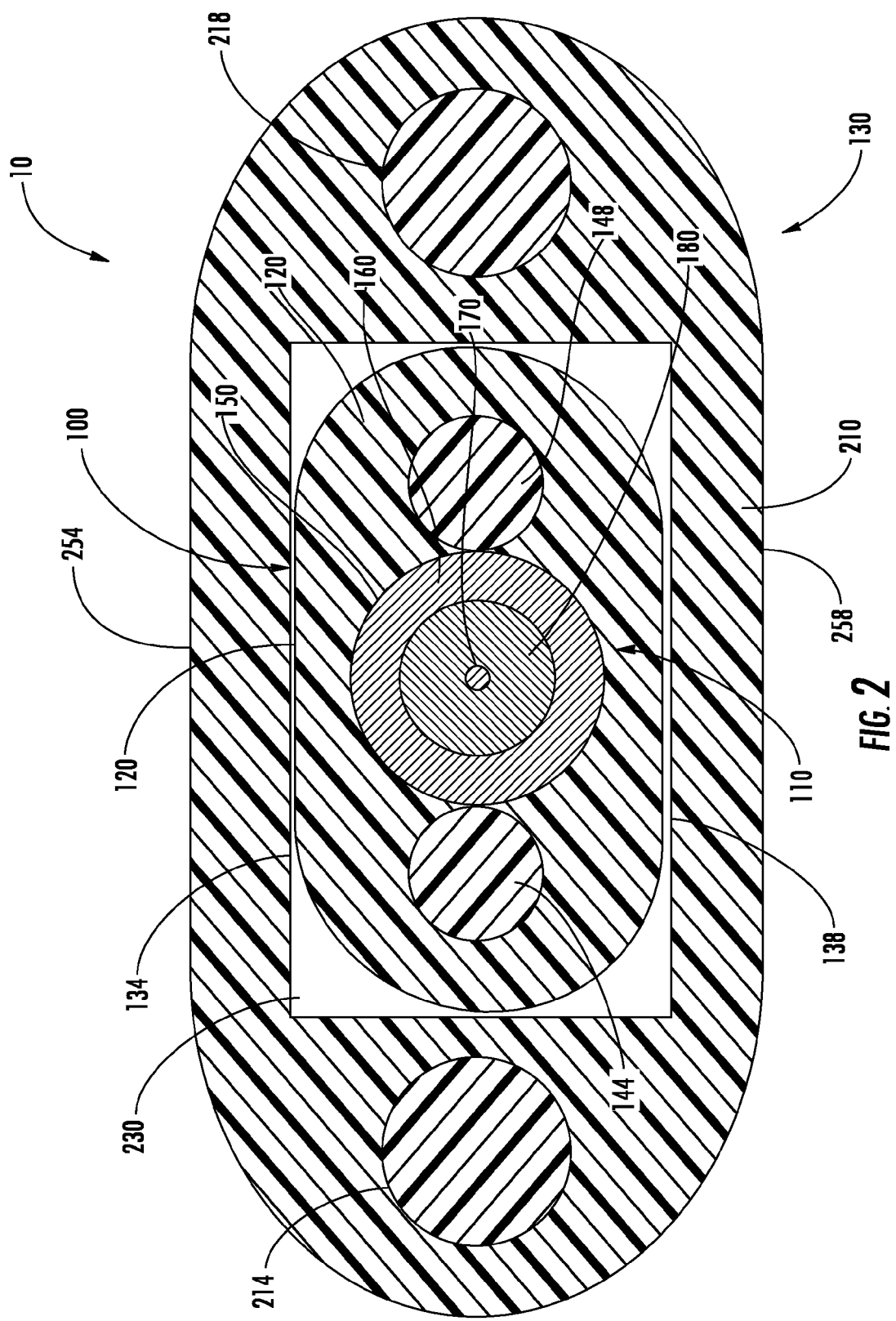
FIG. 2 is a section view of the drop cable assembly of FIG. 1 taken along line 2-2 in FIG. 1.

FIG. 1 is a partial cutaway view of a drop cable assembly 10 according to a first embodiment. FIG. 2 is a section view of the drop cable assembly 10 taken on line 2-2 in FIG. 1. Referring to FIGS. 1 and 2, the drop cable assembly 10 generally includes a drop cable 100 having a core 110 and a drop cable jacket 120, and an outer sheath 130 enclosing the drop cable 100.

The drop cable 100 has a polymeric drop cable jacket 120 with generally flat upper and lower exterior surfaces 134, 138, respectively. This type of cable is sometimes referred to as a 'flat drop cable', although other cable cross-sections are possible. Further, it is understood that the upper and lower surfaces are not perfectly flat, and that some curvature of the surfaces is found in cables marketed and sold as 'flat' drop cables. The drop cable 100 can have curved or arcuate end surfaces that flatten into the generally flat upper and lower exterior surfaces 134, 138. Two spaced strength elements 144, 148 are embedded in the drop cable jacket 120, one located on each side of a cavity 150 of the drop cable 100. The core 110 has an annular buffer tube 160 that encloses an optical fiber 170 that is capable of conveying optical communications. The buffer tube's cross-section is circular. A thread 176 having water-swellable properties can be wound around the exterior of the buffer tube 160 to provide water-blocking for the drop cable assembly 10.

According to one aspect of the present embodiment, the outer sheath 130 acts as a reinforcing member that obviates the need for a messenger cable or section in aerial installations. The outer sheath 130 reinforces the drop cable 100 so that it is self-supporting in aerial applications, even those involving wind-loading and ice-loading environments. The cable 100 is capable of longer aerial spans under heavy wind and ice loadings, such as 50% greater than conventional cables. The self-supporting drop cable assembly 10 can be installed using a p-clamp without requiring messengers or lashing as required in conventional drop cables. Avoiding lashing and/or messenger sections reduces installation costs. The drop cable 100 and the outer sheath 130 are intended by be of substantially equal length, and deployed as a single unit to form an assembly. The geometric center of the cross-sectional area of the drop cable 100 can be generally coincident with the geometric center of the cross-sectional area of the outer sheath 130, or offset by less than 2 mm, for example.

According to one aspect, the drop cable 100 can be of generally conventional design, meaning that existing hardware and tools can be used to access and connectorize the cable 100. For example, the SST-Drop™ Gel-Filled Drop Cable available from Corning Cable Systems, LLC of Hickory N.C. can be used as the drop cable 100. The buffer tube 160 can be filled with a buffer tube filling compound 180 to provide water-blocking in the drop cable 100 and coupling for the optical fiber 170.

The outer sheath 130 can have an exterior shape that is similar to the drop cable 100, with generally flat upper and lower surfaces 254, 258, respectively, that extend into curved or arcuate end surfaces. The outer sheath 130 includes a polymer sheath jacket 210 and a pair of strength members 214, 218 embedded in the jacket portion 200 and spaced on opposite sides of a sheath cavity 230 of the outer sheath 130. The strength members 214, 218 can be sized to provide significant tensile strength to support the drop cable assembly 10 under ice loading, for example. In one embodiment, the secondary jacket 230 can correspond to the jacket of the RPX Drop Cable™ available from Corning Cable Systems, LLC of Hickory N.C.

The sheath cavity 230 can be sized so that it fits relatively tightly about the drop cable 100, as shown in FIG. 2. The total (sum of upper and lower) clearance in the vertical or height dimension between the cavity 230 walls and the surfaces 134, 138 of the drop cable can be in the range of 0.1-0.6 mm, and the total clearance in the lateral dimension (sum of left and right) can be in the range of 0.2-0.7 mm. In general, the drop cable 100 can occupy substantially all or most of the cross-sectional area of the cavity 150 of the outer sheath 130. The drop cable 100 can, for example, occupy between 65%-95% of the cavity 230 cross-sectional area. It may be desirable to leave some clearance between the drop cable 100 and the outer sheath so that the drop cable 100 can translate longitudinally within the outer sheath 130, and to avoid bonding between the sheath jacket 210 and the drop cable jacket 120 as the outer sheath 130 is extruded over the drop cable 100. If more clearance is desired, the drop cable 100 can occupy between 70%-90% of the cavity 230 cross-sectional area.

Fitting the drop cable 100 closely in size to the outer sheath 130 reduces the total material used in the cable assembly 10. If coupling is desired, the size of the sheath cavity 230 can also be selected to provide coupling between the outer sheath 130 and the drop cable 100. The generally flat surfaces 134, 138 of the drop cable 100 can align with generally flat upper and lower surfaces of the cavity 230 of the outer sheath 130. The surfaces 134, 138 can abut and/or at least intermittently contact the cavity walls 230 along the entire length of the outer sheath 130.

In general, the width of the drop cable assembly 10, measured from left to right in FIG. 2, can be at least twice the height of the assembly. In some embodiment, the width can be in the range of 11-20 mm, and the height can be in the range of 6-11 mm.

The cable assembly 10 can be manufactured in a two pass process, with the outer sheath 130 being extruded over the drop cable 100 as the drop cable is advanced along a process direction. The strength members 214, 218 of the outer sheath 130 are also advanced along the process direction as the sheath jacket 210 is extruded around the drop cable 100 and so as to embed the strength members 214, 218 in the sheath jacket. The drop cable 100 can be made using conventional means, such as by using the methods and materials used to manufacture the SST-Drop™ Gel-Filled Drop Cable. The outer sheath 130 can be manufactured using the methods and materials used to manufacture the RPX Drop Cable™, except that rather than forming the sheath jacket 210 over optical fiber ribbons, the sheath jacket 210 is extruded around the drop cable 100. In the exemplary embodiment, the jackets 210, 120 are made from polymer materials by an extrusion process. The polymer can be materials such as, for example, plastics. In the exemplary embodiment, the jackets 210, 120 are UV-resistant medium density polyethylene (MDPE).

The jackets 210, 120 can be generally described as comprising a polymer or as "polymeric", but amounts of other non-polymers can be included in the covering. In this specification, the term "polymeric" allows for the inclusion of additives, and indicates that the covering comprises at least 60% or at least 70% polymer material.

EXAMPLE 1

A fiber optic drop cable assembly 10 as illustrated in FIGS. 1 and 2 has a drop cable 100 with a drop cable jacket 120 comprised of polyethylene. The drop cable 100 corresponds to the SST-Drop™ Gel-Filled Drop Cable available from Corning Cable Systems, LLC. The strength elements 144, 148 are 1.6 mm diameter GRP rods. The buffer tube 160 accommodates a single optical fiber. The sheath cavity 230 is generally rectangular. The polymer sheath jacket 210 is comprised of UV-resistant polyethylene. The outer sheath 130 has a height in the range of 7.5-8.9 mm, and a width in the range of 14.2-16.5 mm. The strength elements 214, 218 are 2.3 mm diameter GRP rods. The outer sheath 130 corresponds to the jacket and strength members used in the RPX Drop Cable™ available from Corning Cable Systems, LLC.

The drop cable assembly 10 may be clamped in a p-clamp over the sheath jacket 210, with the drop cable 100 terminated with an OptiTap® connector available from Corning Cable Systems, LLC. A portion of the sheath jacket 210 is removed to expose the drop cable 100.

The optical fibers employed in the present embodiments may be any suitable type of optical waveguide. Moreover, the optical fibers may be a portion of a fiber optic ribbon, a bundle of optical fibers, or the like. The illustrated drop cable 100 has one optical fiber, although more can be included in the cable.

The exemplary strength elements in the illustrated embodiments are glass-reinforced plastic (GRP) rods. Other materials, including metallic materials and other dielectric materials can also be used to form strength elements in accordance with the present embodiments.

Many modifications and other embodiments of the present invention, within the scope of the claims will be apparent to those skilled in the art. For instance, the concepts of the present invention can be used with any suitable fiber optic cable design and/or method of manufacture. For instance, the embodiments shown can include other suitable cable components such as an armor layer, coupling elements, different cross-sectional shapes, or the like. Thus, it is intended that this invention covers these modifications and embodiments as well those also apparent to those skilled in the art.

What is claimed is:

1. A fiber optic cable assembly, comprising:
    a drop cable, having a longitudal length, comprising:
        a drop cable jacket;
        a core surrounded by the drop cable jacket, the core comprising an optical fiber; and
        first and second strength members embedded in the drop cable jacket; and
    an outer sheath enclosing the drop cable, the outer sheath comprising:
        a sheath jacket having a sheath cavity, the sheath cavity accommodating the drop cable therein; and
        first and second strength members of the outer sheath embedded in the sheath jacket,
    wherein the first and second strength member of the outer sheath have greater cross-sections than either of the first and second strength members of the drop cable;
    wherein the drop cable and the outer sheath are of substantially equal longtitudal length throughout the entire length of the cable assembly and deployed as a single unit, the drop cable occupying at least 65% of a cross-sectional area of the sheath cavity but less than 95% of the cross-sectional area of the sheath cavity, and wherein the drop cable can translate longitudinally within and with respect to the sheath cavity.

2. The cable assembly of claim 1, wherein the first and second strength members of the outer sheath are located on opposite sides of the sheath cavity and the first and second strength members of the drop cable are located on opposite sides of the core.

3. The cable assembly of claim 2, wherein the first and second strength members of the outer sheath and the first and second strength members of the drop cable each comprise glass-reinforced plastic, and wherein the first and second strength members of the outer sheath have a greater load-bearing capacity than the first and second strength members of the drop cable.

4. The cable assembly of claim 3, wherein the core comprises a polymeric buffer tube surrounding the optical fiber.

5. The cable assembly of claim 4, wherein the buffer tube includes a gel filling compound.

6. The cable assembly of claim 4, wherein the buffer tube has a circular annular cross-sectional shape and adjoins the first and second strength members of the drop cable on opposite sides thereof.

7. The cable assembly of claim 6, wherein the drop cable jacket has generally flat upper and lower surfaces.

8. The cable assembly of claim 7, wherein the sheath jacket has generally flat upper and lower surfaces that are respectively aligned with the generally flat upper and lower surfaces of the drop cable.

9. The cable assembly of claim 8, wherein the sheath cavity is generally rectangular in cross-section while the drop cable is not, thereby providing gaps between the exterior of the drop cable jacket and the interior of the sheath cavity.

10. The cable assembly of claim 9, wherein the drop cable occupies at least 70% of a cross-sectional area of the sheath cavity but no more than 90% of a cross-sectional area of the sheath cavity.

11. The cable assembly of claim 1, wherein the cable assembly has a height less than 11 mm.

12. The cable assembly of claim 11, wherein the cable assembly has a width greater than 11 mm.

13. The cable assembly of claim 12, wherein the width of the cable assembly is at least twice the height of the cable assembly.

14. A method of making a fiber optic cable assembly, comprising:
    providing a drop cable, having a longitudal length, comprising:
        a drop cable jacket;
        a core surrounded by the drop cable jacket, the core comprising an optical fiber; and
        first and second strength members embedded in the drop cable jacket, the first and second strength members of the drop cable located on opposite sides of the core; and
    advancing the drop cable along a process direction;
    forming an outer sheath around the drop cable, the outer sheath being of substantially equal longtitudal length to the longitudal length of drop cable throughout the entire length of the cable assembly and comprising:
        a sheath jacket having a sheath cavity, the sheath cavity accommodating the drop cable therein; and
        first and second strength members of the outer sheath embedded in the sheath jacket, wherein the first and second strength members of the outer sheath are located on opposite sides of the sheath cavity,
    wherein the drop cable occupies at least 65% of a cross-sectional area of the sheath cavity but less than 95% of the cross-sectional area of the sheath cavity, and wherein the drop cable can translate longitudinally within and with respect to the sheath cavity.

15. The method of claim 14, wherein the core comprises a polymeric buffer tube having a circular annular cross-sectional shape and adjoins the first and second strength members of the drop cable on opposite sides thereof.

16. The method of claim 15, wherein the drop cable jacket has generally flat upper and lower surfaces and the sheath jacket has generally flat upper and lower surfaces that are respectively aligned with the generally flat upper and lower surfaces of the drop cable, and wherein a width of the drop cable assembly is at least twice a height of the cable assembly.

17. The method of claim 16, wherein forming the outer sheath comprises extruding the sheath jacket around the drop cable.

18. A fiber optic cable assembly, comprising:
    a flat drop cable, having a longtitudal length comprising:
        a drop cable jacket having generally flat upper and lower surfaces;
        a core surrounded by the drop cable jacket, the core including at least one optical fiber; and
        a first strength member on one side of the core and a second strength member on a second side of the core; and
    an outer sheath enclosing the drop cable, the outer sheath being of substantially equal longtitudal length to the longtitudal length of the drop cable throughout the entire length of the cable assembly and comprising:
  a sheath jacket having generally flat upper and lower surfaces and having a sheath cavity, the sheath cavity accommodating the drop cable; and
  a first and a second strength member embedded in the sheath jacket, one on each side of the sheath cavity,
wherein the first and second strength members of the outer sheath and the first and second strength members of the drop cable each consist essentially of the same material as one another, and wherein the first and second strength members of the outer sheath have a greater load-bearing capacity than the first and second strength members of the drop cable, and
wherein the drop cable can translate longitudinally within the outer sheath cavity.

19. The cable assembly of claim 18, wherein the core comprises a polymeric buffer tube having a circular annular cross-sectional shape and adjoins the first and second strength members of the drop cable on opposite sides thereof.

20. The cable assembly of claim 19, wherein the drop cable occupies between 65%-95% of a cross-sectional area of the sheath cavity and wherein a width of the cable assembly is at least twice a height of the cable assembly.

* * * * *